United States Patent [19]
Templin

[11] 3,717,994
[45] Feb. 27, 1973

[54] GAS TURBINE SYSTEM WITH REGENERATOR BYPASS ONLY DURING STARTING

[75] Inventor: Jackson R. Templin, Anderson, Ind.

[73] Assignee: General Motors Corporation, Detroit, Mich.

[22] Filed: Nov. 12, 1970

[21] Appl. No.: 88,903

[52] U.S. Cl. ............................................60/39.51 R
[51] Int. Cl. .................................................F02c 7/10
[58] Field of Search ........60/39.51 H, 39.51 R; 165/7

[56] References Cited

UNITED STATES PATENTS

| 2,622,395 | 12/1952 | Bowden | 60/39.51 R |
| 2,883,160 | 4/1959 | Palmiter et al. | 165/7 |

FOREIGN PATENTS OR APPLICATIONS

| 710,536 | 6/1965 | Canada | 60/39.51 R |
| 836,135 | 6/1960 | Great Britain | 60/39.51 R |
| 648,290 | 5/1960 | Italy | 60/39.51 R |
| 640,978 | 8/1950 | Great Britain | 60/39.51 R |
| 525,550 | 8/1940 | Great Britain | 60/39.51 R |

Primary Examiner—Carlton R. Croyle
Assistant Examiner—Warren Olsen
Attorney—Paul Fitzpatrick and Jean L. Carpenter

[57] ABSTRACT

A regenerative gas turbine engine has the engine compressor connected to the engine combustion apparatus through a regenerator in normal operation of the engine so as to heat the air prior to combustion. During starting of the engine, the regenerator is by-passed so that the compressed air warmed by compression will not be cooled in the regenerator.

5 Claims, 3 Drawing Figures

INVENTOR.
Jackson R. Templin
BY
Paul Fitzpatrick
ATTORNEY

GAS TURBINE SYSTEM WITH REGENERATOR BYPASS ONLY DURING STARTING

My invention is directed to regenerative gas turbine engines and particularly to an arrangement for improving the starting characteristics of such engines involving by-passing the compressed air past the regenerator during starting.

Because of the very great improvement in fuel consumption made possible by a heat exchanger such as a regenerator or recuperator in a gas turbine engine, most engines proposed for service such as in automotive vehicles have embodied a regenerator. The regenerator transfers heat from the turbine exhaust of the engine to the compressed air flowing to the combustion apparatus, thereby recovering heat which otherwise would be lost and reducing the amount of fuel required to operate the engine. The saving in fuel is very substantial, particularly, from a relative point of view, at light load or idling conditions of operation of the engine.

While there are other possible ways to start a gas turbine, the usual mode of starting is to crank at least the gas generator portion of the engine by an electrical or other power-operated starting motor which accelerates the engine to a speed at which, upon introduction of fuel and ignition of the fuel, successful combustion may take place. Starting further involves continued cranking with the engine helping the starter until a speed is reached at which the engine is self-sustaining; that is, the turbine is capable of generating more power than is required to drive the compressor, whereupon the starter may be disconnected. In general, this is the cycle employed regardless of the particular type of starter used, whether it be a mechanical connection or some arrangement for impinging air on a part of the rotating compressor or turbine machinery, for example. A gas turbine starting system is described in Creswick et al U.S. Pat. No. 2,938,338, May 31, 1960.

Once the engine is started and has been in normal operation long enough to heat the regenerator and bring it to a more or less steady state condition, the regenerator is very beneficial to the operation of the engine. However, in starting the cold engine, the air which has been compressed by the compressor turning over at relatively low speed during starting is warmed to some extent. Both before and after the initiation of supply of fuel and light-off of the combustion apparatus, the warm air would contribute somewhat more energy to the turbine and thus minimize the load on the starter, or expedite the starting of the engine. When the air is passed through the cold regenerator, however, it is cooled and thus there is a loss of energy in the form of heat. Moreover, since there is some pressure drop in any heat exchanger, this represents a further loss of energy which must be made up by the starter. These disadvantages may be obviated by closing off flow through the regenerator during starting of the engine and, in general, preferably until the heat exchanger is then heated by the exhaust gas to a point at which it will add heat to, rather than subtract it from, the compressed air. Also, most regenerative gas turbines which have been put into service include rotary regenerators, in which a heat storing and releasing mass is continuously rotated by the gas generator of the turbine engine. These regenerators have seals which provide some drag, the drag generally increasing with pressure. This being the case, I also contemplate, where desired, closing off the regenerator completely from the compressor so that there is no pressure rise in the heat exchanger, and thus frictional drag which provides a load on the starter or upon the initial acceleration of the engine is avoided.

It will be seen, therefore, that my invention contemplates the provision in any usual regenerative gas turbine engine of means for by-passing the compressed air passage of the regenerator during starting of the engine; and also, in some cases, completely isolating the compressed air passage of the regenerator from the flow circuit between the compressor and combustion apparatus of the engine. The foregoing will indicate to those skilled in the art the nature of my invention, but it will be more fully understood and the advantages appreciated upon consideration of the succeeding detailed description of the preferred embodiment of the invention and the accompanying drawings thereof.

The principal objects of my invention are to improve the starting characteristics of regenerative gas turbine engines and to provide a simple and effective arrangement for minimizing or eliminating depreciation of the starting performance of such engines in cold starts by loss of heat to the regenerator.

A further object is to minimize seal drag in a rotary regenerator during starting of a regenerative gas turbine.

Referring to the drawings.

Figure 1:
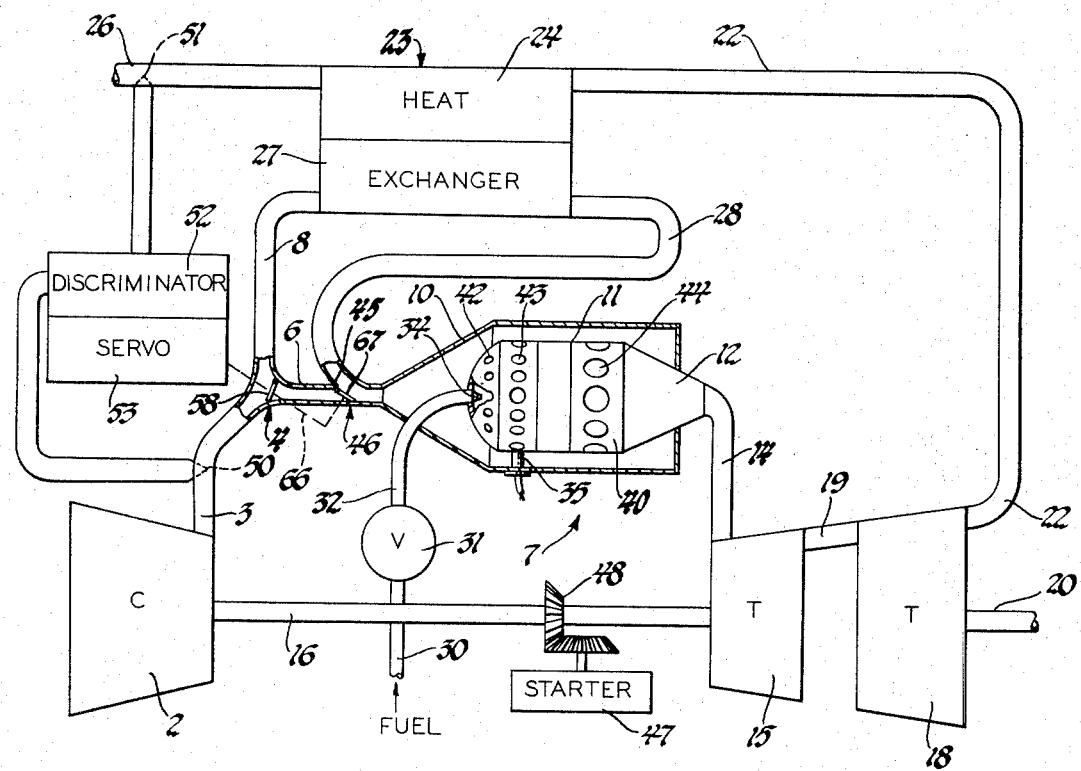
FIG. 1 is a schematic diagram of a regenerative gas turbine engine incorporating the invention.

FIG. 1, except for the improvement which forms the subject matter of my invention, illustrates a typical regenerative gas turbine engine of the free turbine type. The engine includes an air compressor 2 which discharges through a compressed air conduit 3 to a valve 4 which controls the division of flow between a first compressed air conduit 6, leading to combustion apparatus 7, and a second compressed air conduit 8. The combustion apparatus 7 includes an outer case 10 and a combustion liner or flame tube 11, the combustion liner being enclosed within the outer case for flow of air from within the case into the liner. The combustion liner includes an outlet or transition portion 12 from which combustion products are discharged from the combustion apparatus through a conduit 14 into a first or high pressure turbine 15. Turbine 15 drives the compressor 2 through a shaft 16.

The exhaust from turbine 15 is supplied to a second or low pressure turbine 18. While ordinarily these two turbines are integrated structurally, they are illustrated here as being connected through a combustion products conduit 19. The turbine 18 drives a shaft 20 which may be connected to drive any load including, for example, the driving wheels of a self-propelled vehicle. The two turbines may be mechanically coupled together, or a single turbine driving shafts 16 and 20 may be used. The low pressure exhaust from turbine 18 is conducted through suitable ducting 22 to a heat exchanger 23 where the exhaust gas flows through one pass 24 of the heat exchanger to an atmospheric exhaust 26. The heat exchanger may be of any suitable type such, for example, as a rotary regenerator or a fixed recuperator. As employed in a conventional gas turbine engine, its purpose is to recover heat from the hot low pressure gas exhaust gases and heat the compressed air flowing from the compressor to the combustion apparatus so as to reduce the fuel consumption required to provide the high temperature motive fluid.

The second compressed air conduit 8 previously referred to leads to a compressed air pass 27 of the heat exchanger 23 from which the heated compressed air flows through a conduit 28 to the combustion apparatus 7.

Fuel from a suitable source of fuel under pressure is led through a fuel line 30, a fuel control represented as a fuel controlling valve 31, and a line 32 to a fuel spray nozzle 34 at the upstream end of the combustion liner 11. The valve 31 may be taken as a symbolic representation of suitable fuel controlling means for the engine which may, of course, include such usual components as maximum and minimum flow limiters and governing devices but which, in any usual case, includes a throttling valve which ultimately controls the rate of flow of fuel to the combustion apparatus. The fuel controller 31 is set to the desired power level by a control device which may be a hand lever or an accelerator pedal of a vehicle (not illustrated).

The combustion apparatus 7, except as specifically pointed out below, is of a well known type in which the case 10 contains the compressed air which is diffused and flows at relatively low velocity within the case, flowing through openings in the liner 11 to the interior of the liner. Fuel is sprayed into the air within the liner by the nozzle 34, is burned, and the resulting combustion products are discharged through the outlet portion 12 of the combustion apparatus. An electric spark igniter is indicated at 35. Means for admission of primary or combustion air to the combustion zone of the liner are indicated schematically by small ports 42 and 43. A ring of large air ports 44 in the ring 40 serve to admit dilution air to the downstream portion of the combustion liner. Such combustion liner structure is well understood by those skilled in the art and will not be further described here.

Attention may be invited to Amann et al U.S. Pat. No. 3,116,605, Jan. 7, 1964, and Collman et al. U.S. Pat. No. 3,267,674, Aug. 23, 1966, which structurally disclose regenerative gas turbine engines of the type illustrated schematically in FIG. 1, and also show combustion apparatus of the type referred to.

As will be apparent from what has been said above, my invention relates to the arrangement for conducting the air from the compressor and heat exchanger to the combustion apparatus. This may be expressed concisely as follows: As previously indicated, the compressor outlet conduit 3 is divided between the first air conduit 6 leading directly to the combustion apparatus and the second air conduit 8 which leads through regenerator 23 and conduit 28 to the combustion apparatus. Conduits 28 and 6 are joined at a wye connection at 45. The valve 4 provides for blocking either the first conduit 6 for normal operation of the engine or the second conduit 8 for starting of the engine. Preferably, at least with rotary regenerators, a second valve 46 provides for closing off the conduit 28 from the compressor so that the heat exchanger is not pressurized during starting. Thus, for starting, conduits 8 and 28 are both closed off from conduits 3 and 6. For normal running, conduit 6 is closed off at both ends and the combustion air flows through the heat exchanger.

While the structure of the starter is immaterial, such a starter is indicated on the drawing at 47 and may be any sort of suitable motor. It is shown connected to the shaft 66 of the gas generator through gearing 48. It may be operated as taught by the Creswick et al. patent referred to above.

The valves 4 and 46 might be operated manually in any suitable manner, but one particularly suitable manner of operating the valves is in response to a device which compares exhaust gas temperature downstream of the regenerator with compressor discharge air temperature and maintains the valves in the starting condition until the regenerator discharge is as warm as the compressor discharge. At this point, the regenerator will necessarily heat the compressed air rather than cool it. There should be sufficient heat available to more than compensate for the additional pressure drop.

As illustrated schematically in FIG. 1, a thermocouple 50 is mounted in the air conduit 3 and a thermocouple 51 is mounted in the exhaust duct 26. These are connected through suitable wiring to a discriminator 52 which controls a servomechanism 53 to operate the valves 4 and 46. The discriminator 52 may be any suitable electric or electronic circuit to compare the voltages generated by the thermocouples 50 and 51 and actuate the servomechanism to move the valves to the position shown when temperature at 51 is greater than that at 50 and to move them to the opposite position, blocking off the regenerator, when the temperature at 50 is greater than temperature at 51. The servomechanism may be any suitable electric motor or air or hydraulic device. There is no need to enlarge upon suitable servos or comparison circuits. A simple circuit for comparing temperatures at two thermocouples is shown in Bockemuehl et al. U.S. Pat. No. 3,030,575, Apr. 17, 1962.

Figure 2:
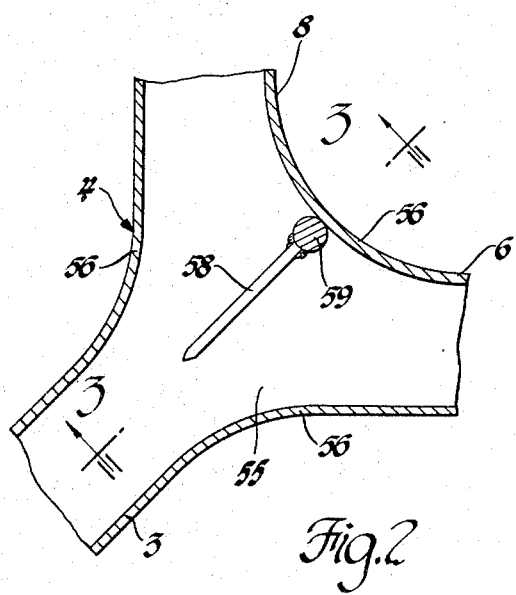
FIG. 2 is a sectional view of an air flow controlling valve taken on the plane indicated by the line 2—2 in FIG. 3.
Figure 3:
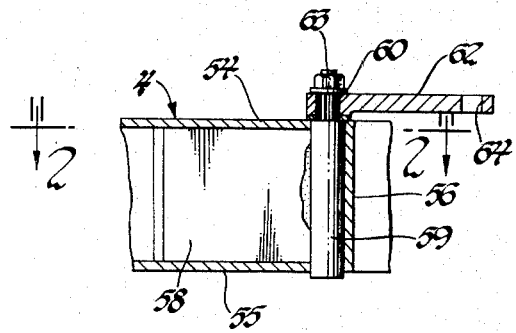
FIG. 3 is a sectional view of the valve taken on the plane indicated by the line 3—3 in FIG. 2.

The structure of a valve such as 4 or 46 is merely a matter of mechanics of construction, and the details are quite immaterial to my invention. However, to clarify what is intended, a suitable valve structure is illustrated somewhat schematically in FIGS. 2 and 3. As illustrated in these figures, the valve 4 includes a body bounded by a flat upper wall 54 and lower wall 55, with side walls 56 defining with the upper and lower walls an entrance from the conduit 3 and the outlet to the conduits 6 and 8, generally as illustrated. A flow directing vane 58 is integral with a shaft 59 rotatably mounted in the walls 54 and 55 immediately adjacent the wall 56 between outlets 6 and 8. The upper end of shaft 59 projects through wall 54 and is splined at 60 to receive a control arm 62 retained by a cap screw 63 and a washer. The outer end of arm 62 has a drilled hole 64 for connection of a suitable control linkage. The control linkage, which may be of any desired nature, is indicated in FIG. 1 by the broken line 66 connecting the servo 53 to air control valves 4 and 46. The servo operates through the linkage to move the vane 58 against one or the other part of wall 56 to close one or the other of conduits 6 and 8. Likewise, it operates a vane 67 of valve 46 to close off the discharge end of conduit 6 or 28. The structure of valve 46 may be essentially the same as that shown for valve 4.

The operation of the system should be clear from the foregoing but may be outlined briefly. In a cold start of the engine, the starter, fuel supply, and igniter are operated in any customary manner which may be as described in the Creswick et al. patent referred to above. When the engine is cold, the discriminator responds to the temperatures sensed by the thermocouples to block off the heat exchanger from the compressor and combustion apparatus. When combustion gases heat up the exchanger and the exhaust gas becomes warmer than the compressor discharge, the discriminator then actuates the servo to reverse the position of the valves and put the engine in normal operation.

Obviously, the control of the valves could be accomplished manually or by other means than the particular responsive means indicated here. If any automatic means is employed, it should be such as to discriminate between a cold start and a restart of the engine in the case in which it has been briefly shut down and the heat exchanger remains hot. The discriminator system illustrated will accomplish this function.

Again, it may be pointed out that the valve 46 is provided primarily as a means to unload a rotary regenerator, and therefore may have little use in a system with fixed recuperators. With either type of heat exchanger, the valve 46 may be omitted.

The utility of a system according to my invention in improving the starting characteristics of a regenerative gas turbine will be clear to those skilled in the art from the foregoing description.

The detailed description of preferred embodiments of the invention for the purpose of explaining the principles thereof is not to be considered as limiting or restricting the invention, since many modifications may be made by the exercise of skill in the art without departing from the scope of the invention.

I claim:

1. A regenerative gas turbine engine comprising, in combination, in flow sequence as recited, air compressor means, a regenerative heat exchanger, a first compressed air conduit leading from the compressor means through one pass of the heat exchanger to a combustion apparatus, the combustion apparatus, turbine means energized from the combustion apparatus including means driving the compressor means, and a turbine exhaust duct through the other pass of the heat exchanger; a second compressed air conduit leading from the compressor means to the combustion apparatus by-passing the heat exchanger; and means responsive to a condition of operation of the engine operative to direct at least substantially the entire compressor output through the first conduit during normal engine operation so as to provide air heated by the regenerator to the combustion apparatus and operative to direct at least substantially the entire compressor output through the second conduit during cold starting of the engine so as to prevent significant cooling of the compressor output to the combustion apparatus by the regenerator while starting.

2. An engine as recited in claim 1 in which the last-mentioned means includes valve means effective to isolate the first pass of the regenerator from the second compressed air conduit so that the first pass is not pressurized during cold starting.

3. A regenerative gas turbine engine comprising, in combination, in flow sequence as recited, air compressor means, a regenerative heat exchanger, a first compressed air conduit leading from the compressor means through one pass of the heat exchanger to a combustion apparatus, the combustion apparatus, turbine means energized from the combustion apparatus including means driving the compressor means, and a turbine exhaust duct through the other pass of the heat exchanger; a second compressed air conduit leading from the compressor means to the combustion apparatus by-passing the heat exchanger; and means responsive to a condition of operation of the engine operative to direct at least substantially the entire compressor output through the first conduit during normal engine operation so as to provide air heated by the regenerator to the combustion apparatus and operative to direct at least substantially the entire compressor output through the second conduit when the regenerator is cold so as to prevent significant cooling of the compressor output to the combustion apparatus by the regenerator while cold.

4. A regenerative gas turbine engine comprising, in combination, in flow sequence as recited, air compressor means, a regenerative heat exchanger, a first compressed air conduit leading from the compressor means through one pass of the heat exchanger to a combustion apparatus, the combustion apparatus, turbine means energized from the combustion apparatus including means driving the compressor means, and a turbine exhaust duct through the other pass of the heat exchanger; a second compressed air conduit leading from the compressor means to the combustion apparatus by-passing the heat exchanger; and means operative to direct the compressor output through the first conduit during normal engine operation so as to provide air heated by the regenerator to the combustion apparatus and operative to direct the compressor output through the second conduit during cold starting of the engine so as to prevent cooling of the compressor output by the regenerator while starting, the last-recited means being responsive to compressor discharge temperature and to exhaust gas temperature downstream of the regenerator.

5. A method of operating a regenerative gas turbine engine having, in flow sequence as recited, air compressor means, a regenerative heat exchanger, a first compressed air conduit leading from the compressor means through one pass of the heat exchanger to a combustion apparatus, the combustion apparatus, turbine means energized from the combustion apparatus including means driving the compressor means, and a turbine exhaust duct through the other pass of the heat exchanger, and having a second compressed air conduit leading from the compressor means to the combustion apparatus by-passing the heat exchanger; the method comprising directing the compressor output through the first conduit during normal engine operation so as to provide air heated by the regenerator as the combustion air for the combustion apparatus and directing the compressor output through the second conduit when the regenerator is cold so as to prevent cooling of the combustion air by the cold regenerator.

* * * * *